Patented Aug. 11, 1931

1,818,927

UNITED STATES PATENT OFFICE

JOHN NAISH GOLDSMITH, OF LONDON, THOMAS THORNE BAKER, OF HATCH END, MIDDLESEX, AND CHARLES BONAMICO, OF LONDON, ENGLAND, ASSIGNORS TO SPICERS LIMITED, OF LONDON, ENGLAND, A BRITISH COMPANY

COLOR PHOTOGRAPHY

No Drawing. Application filed June 20, 1930, Serial No. 462,698, and in Great Britain August 1, 1929.

This invention comprises improvements in or relating to color photography, and relates especially to the production of multicolor screens for use in color cinematography.

Many difficulties have been encountered in applying a multicolor screen to commercial cellulose acetate or celluloid film, due largely to the presence of plasticizers and/or high boilers in the film, which render the surface of the latter shiny and repellant to dyes. In processes for the production of a multicolor screen on commercial cellulose acetate or celluloid film as hitherto proposed it has been necessary to pretreat the raw film either by applying to its surface a layer of material such as collodion, which is amenable to dyes and bleaching agents, or by immersing it in a solution which will act on its surface so as to render it no longer repellant to dyes.

It is one object of the present invention to provide means whereby a multicolor screen can be applied directly to a commercial cellulose acetate or celluloid film without the necessity of pretreating the film.

Further, it has not hitherto been found possible to rule two series of lines, inclined at an angle to one another, in different colors on the surface of the film, without the formation of overlap colors at the points of intersection of the two series of lines. It is another object of this invention to provide means whereby two or more series of lines in different colors may be ruled on the surface of the film without any overlap color being formed at their points of intersection.

According to the invention a multicolor screen is produced on a raw or prepared film of cellulose, or of an ester or ether of cellulose such for example as cellulose acetate, nitrocellulose, celluloid or the like, by applying to the surface of the film one constituent of a dye or coloring matter and then impressing lines or other geometrical patterns on the surface of the film of a medium containing a compound capable of reacting with the said constituent to form a coloring matter. If desired the surface of the film may be treated with an alcoholic solution of caustic potash before applying the first constituent of the dye or coloring matter.

According to a feature of the invention, multicolor patterns may be formed on the surface of the film by first applying one constituent of the coloring matter to the film, and then successively impressing on the film one or more media each containing a compound capable of reacting with the said constituent to form a differently colored coloring matter.

In one form of the invention the reaction due to the impression of the first series of geometrical patterns is allowed to proceed to completion before applying the second series which is to develop the second color. All the first constituent of the coloring matter will be exhausted at the areas of reaction with the first medium, so that none will be left to react with the second medium at the points where the latter is superimposed on the first layer, and therefore no overlap color will be formed.

In another form of the invention mixed colors may be formed at the points of intersection, by impressing the second medium on section, by impressing the second medium on the film before the reaction due to the impression of the first medium on the film is completed, or by applying so much of the first dye-component to the surface of the film, that this component is not exhausted by reaction with the first medium.

Some practical examples of the invention will now be given.

A cellulose acetate film is impregnated for a period of two minutes with a solution of β naphthol in N/10 alcoholic sodium hydrate, and the excess solution is removed for example by means of a roller. A series of red lines is then produced by ruling lines on the film with a solution of diazotized α naphthylamine. The second series of lines is then produced by ruling at right angles to the first series with a solution of diazotized dianisidine.

In a preferred form of the invention the red and blue lines may be developed on a film impregnated with naphthol A. S., i. e. the anilide of 2:3 oxynaphthoic acid. In the case of cellulose acetate film, the film is impregnated for a period of two minutes in a N/10 solution of alcoholic potash, containing 1% of naphthol A. S. The excess of solution is removed for example by means of a roller. A series of lines of a strong solution of variamine blue salt B. i. e., diazotized 4 amino 4' ethoxy diphenylamine, in a mixture of equal proportions of water and alcohol containing sodium acetate is then ruled on the film. After three minutes the excess of solution is removed. A second series of lines of fast scarlet salt G. G., i. e., diazotized 2:5 dichloraniline, dissolved in a mixture of equal proportions of water and alcohol containing aluminium sulphate is then ruled on the film at right angles to the first series and the film is washed after three minutes. It is found that the blue color improves on standing for two hours. In order to develop the third color, e. g., yellow, the film is now placed in a solution of a suitable diazo compound which develops a dye in the areas where the naphthol A. S. has not been exhausted by the application of the two series of lines. Alternatively the third color can be obtained by dyeing over the whole surface of the film with a yellow dye.

In the case of celluloid it is preferable to impregnate the surface of the film with a solution of naphthol A. S. containing caustic soda. A suitable solution is prepared by dissolving to a clear solution 1 gram of naphthol A. S. and 1.5 cc. of caustic soda of 62° Tw. with 10 cc. of water. The solution is heated to dissolve as much of the solids as possible and filtered. 2 cc. of this solution mixed with 0.5 cc. methylated spirit and 2 cc. of acetone are poured on the film and left for about 30 seconds and the excess of solution removed.

Red lines are then developed on the film by ruling on a solution of fast scarlet salt G. G. in a mixture of equal proportion of methylated spirit and water containing sodium bicarbonate and aluminium sulphate. The second series of lines is formed by ruling on a solution of variamine blue salt B in a mixture of equal proportions of methylated spirit and water containing sodium bicarbonate. After a period of about one minute the film is washed in water.

We claim:—

1. In a method for the production of a multicolor screen for color photography on a film comprising a cellulose derivative, the steps consisting in applying to the surface of the film one constituent of a coloring matter, and then impressing geometrical patterns on the surface of the film of a medium containing a compound capable of reacting with the said constituent to form a coloring matter.

2. In a method for the production of a multicolor screen for color photography on a cellulose ester film, the steps consisting in applying to the surface of the film one constituent of a coloring matter, and then impressing geometrical patterns on the surface of the film of a medium containing a compound capable of reacting with the said constituent to form a coloring matter.

3. In a method for the production of a multicolor screen for color photography on a cellulose acetate film, the steps consisting in applying to the surface of the film one constituent of a coloring matter, and then impressing geometrical patterns on the surface of the film of a medium containing a compound capable of reacting with the said constituent to form a coloring matter.

4. In a method for the production of a multicolor screen for color photography on a film comprising a cellulose derivative, the steps consisting in applying to the surface of the film one constituent of a coloring matter and then impressing lines on the surface of the film of a medium containing a compound capable of reacting with the said constituent to form a coloring matter.

5. A method for the production of a multicolor screen for color photography on a film comprising a cellulose derivative, which consists in first applying one constituent of the coloring matter to the film, and then successively impressing geometrical patterns on the film of any number of media each capable of reacting with the said constituent to form a differently colored coloring matter.

6. A method for the production of a multicolor screen for color photography on a film comprising a cellulose derivative, which consists in first applying one constituent of the coloring matter to the film, impressing on the film a series of geometrical patterns of a medium capable of reacting with the said constituent to form a coloring matter, allowing the reaction between the said medium and said constituent to proceed to completion, and then applying to the film a second series of geometrical patterns of a second medium capable of reacting with the aforesaid constituent to form a differently colored coloring matter.

7. A method for the production of a multicolor screen for color photography on a film comprising a cellulose derivative, which consists in first applying one constituent of a coloring matter to the film, impressing on the film a series of geometrical patterns of a medium capable of reacting with the said constituent to form a coloring matter, said medium being applied to the film in such quantity that the aforesaid constituent is not exhausted by the reaction in the areas where said medium is applied, and then applying a second series of geometrical patterns of a second medium capable of reacting with the aforesaid constituent to form a differently colored coloring matter.

8. A method of applying a multicolor screen to a film of cellulose acetate, which comprises impregnating the latter with a solution of β-naphthol in alcoholic sodium hydrate, developing red lines on the film by ruling on lines of diazotized α-naphthylamine, and thereafter developing blue lines on the film by ruling on a second series of lines with a solution of diazotized dianisidine.

9. A method of applying a multicolor screen to a film comprising a cellulose derivative, which comprises impregnating the film with a solution of the anilide 2:3 oxynapthoic acid, in alcoholic potash, developing red lines by ruling on lines of a solution of diazotized 2:5 dichloraniline, and developing blue lines on the film by ruling on lines of a solution of 4 amino 4' ethoxy diphenylamine.

10. A method of applying a multicolor screen to a film comprising a cellulose derivative, which comprises impregnating the film with a solution of the anilide 2:3 oxynaphthoic acid, in alcoholic potash, developing red lines by ruling on lines of a solution of diazotized 2:5 dichloraniline, developing blue lines on the film by ruling on lines of a solution of 4 amino 4' ethoxy diphenylamine, and finally developing a third color by dyeing the whole surface of the film with a yellow dye.

In testimony whereof we affix our signatures.

JOHN NAISH GOLDSMITH.
THOMAS THORNE BAKER.
CHARLES BONAMICO.